United States Patent
Hosoya et al.

[11] Patent Number: 6,126,759
[45] Date of Patent: Oct. 3, 2000

[54] STEEL SHEET FOR 2-PIECE BATTERY CAN HAVING EXCELLENT FORMABILITY, ANTI SECONDARY WORK EMBRITTLEMENT AND CORROSION RESISTANCE

[75] Inventors: Yoshihiro Hosoya; Katsumi Tanikawa; Katsumi Kojima; Takashi Awaya; Hirohide Furuya, all of Tokyo, Japan

[73] Assignee: NKK Corporation, Tokyo, Japan

[21] Appl. No.: 08/913,642

[22] PCT Filed: Feb. 7, 1997

[86] PCT No.: PCT/JP97/00327

§ 371 Date: Oct. 9, 1997

§ 102(e) Date: Oct. 9, 1997

[87] PCT Pub. No.: WO97/29217

PCT Pub. Date: Aug. 14, 1997

[30] Foreign Application Priority Data

Feb. 8, 1996 [JP] Japan .................................. 8-048147
Feb. 8, 1996 [JP] Japan .................................. 8-048148

[51] Int. Cl.$^7$ ................................................. C22C 38/00
[52] U.S. Cl. .................... 148/320; 148/330; 148/333; 148/336; 428/679; 428/682
[58] Field of Search ...................... 148/320, 330, 148/333, 336; 420/121, 112, 104, 106; 428/679, 682

[56] References Cited

U.S. PATENT DOCUMENTS 5,648,044  7/1997  Hoshino et al. ..................... 148/330
5,725,690  3/1998  Ochi et al. .......................... 148/320

FOREIGN PATENT DOCUMENTS

| 169727 | 12/1981 | Japan | 148/328 |
| 50149 | 3/1985 | Japan | 148/320 |
| 5-21044 | 1/1993 | Japan . | |
| 6-344003 | 12/1994 | Japan . | |
| 6-346150 | 12/1994 | Japan . | |
| 6-346282 | 12/1994 | Japan . | |
| 6-34684 | 12/1994 | Japan . | |
| 7-99686 | 10/1995 | Japan . | |

*Primary Examiner*—Deborah Yee
*Attorney, Agent, or Firm*—Nields, Lemack & Dingman

[57] ABSTRACT

This invention is to provide a steel sheet for 2-piece battery cans, which has excellent formability in DI molding to give thin-walled, side body parts, and, more preferably, a steel sheet for 2-piece battery cans, which, after having been formed into cans, has high mechanical strength and excellent anti-secondary work embrittlement with excellent corrosion resistance. The steel sheet for 2-piece battery cans of the invention contains S and O (where O is the total oxygen content) while satisfying the conditions that S is from 0.005 to 0.015 wt. %, preferably from 0.005 to 0.012 wt. %, that 0 is from 0 to 0.0025 wt. % and that [S/10+O]≦0.0035 wt. %, preferably [S/10 +0]≦0.0030 wt. %. More preferably, the steel sheet contains B of from 0.0005 to 0.0015 wt. % while satisfying 0.2≦B/N≦1.0, or contains either one or both of Cr of being from 0.03 to 0.10 wt. % and Ni of being from 0.01 to 0.10 wt. %, the total of the two being not larger than 0.10 wt. %. The both surfaces of the steel sheet may be plated with Ni or an Fe—Ni alloy in order to ensure more excellent corrosion resistance of the steel sheet.

23 Claims, 5 Drawing Sheets

O : Completely flattened
● : Cracked due to compression
× : Cracked due to ironing
▲ : Failed in DI into cans ○ : Cr-added steel with Ni plate of 4 μm thick
● : Cr-added steel with Ni plate of 2 μm thick
□ : Ni-added steel with Ni plate of 4 μm thick
■ : Ni-added steel with Ni plate of 2 μm thick

STEEL SHEET FOR 2-PIECE BATTERY CAN HAVING EXCELLENT FORMABILITY, ANTI SECONDARY WORK EMBRITTLEMENT AND CORROSION RESISTANCE

TECHNICAL FIELD

The present invention relates to steel sheets for 2-piece battery cans, which are suitable for DI ("draw-and-ironing"; the same shall apply hereinunder) forming.

BACKGROUND ART

Recently, in the field of battery cans, it is desired that their body weight is reduced, that the processes for producing them are simplified, that the costs of raw materials for them and also the production costs are reduced, and that the walls of their side body parts are thinned to thereby increase their capacity for fillers, for which so-called 2-piece battery cans where the cathode terminal side and the side body part are integrated have been developed (see Japanese Patent Publication No. 7-99686), and have already been put into practical use. The process of producing such 2-piece battery cans comprises a step of blanking a steel sheet having a thickness of from 0.4 to 0.5 mm or so to give steel discs and thereafter deep-drawing each steel disc into a cylindrical part, followed by a step of ironing said cylindrical part with a plurality of ironing dies thereby to produce a side body part of the can having a prolonged length while thinning the wall of said side body part. The wall of the side body part of the can as produced through said process shall finally have a reduced thickness of not larger than 0.15 mm.

Therefore, the steel sheet for such 2-piece battery cans is required to have good formability in ironing or the like, and also to have high mechanical strength and good anti-secondary work embrittlement while it is in a side body part of the can. In addition, since the terminals and other parts of such 2-piece battery cans are easily corroded, the steel sheet for said cans is required to have good corrosion resistance, for which said steel sheet is generally coated with an Ni plate to ensure its corrosion resistance.

The following techniques have heretofore been proposed for steel sheets for 2-piece battery cans.

(1) A technique of preventing micro-cracks from being formed on the surfaces of 2-piece battery cans during draw-and-ironing of a steel sheet to give said cans in consideration of the battery characteristics and the corrosion resistance of 2-piece battery cans, the absence of said micro-cracks being helpful in ensuring good battery characteristics of the cans (see Japanese Patent Application Laid-Open No. 5-21044).

(2) A technique of ensuring a uniform temperature and a uniform drawing ratio of a steel sheet for 2-piece battery cans during the steps of hot-rolling and cold-rolling said steel sheet in order to attenuate the in-plane anisotropy of the resulting rolled steel sheet and to enhance the uniformity thereof in the direction of its coiling width, thereby controlling the final steel sheet to have a defined r value and a defined Δr value (see Japanese Patent Application Laid-Open No. 6-344003).

(3) A technique of producing a steel sheet for 2-piece battery cans through continuous annealing, in which the carbon content of said steel sheet is defined to be not larger than 0.009% by weight (substantially from 0.002 to 0.003% by weight) (see Japanese Patent Application Laid-Open No. 6-346150).

(4) A technique of defining the surface roughness of a steel sheet for 2-piece battery cans to thereby prolong the life of the mold to be used for draw-and-ironing molding of said steel sheet (see Japanese Patent Application Laid-Open No. 6-346282).

(5) A technique of controlling the film thickness and the morphology of the Ni plate layer to be formed on the surface of a steel sheet for 2-piece battery cans, thereby ensuring the corrosion resistance of said steel sheet. (see Japanese Patent Application Laid-Open No. 6-346284).

These prior art techniques are to define the steel sheet for 2-piece battery cans and the method for producing said steel sheet as disclosed in the above-mentioned Japanese Patent Publication No. 7-99686. However, none of these suggests any explicit means of defining the optimum components of constituting the steel sheet for 2-piece battery cans in order that the steel sheet may have good DI moldability, that the steel sheet may have high mechanical strength and good anti-secondary work embrittlement while being in cylindrical forms, that the steel sheet may have good Ni-platability with homogeneous diffusion of Ni into the surface of said steel sheet being coated, and that the Ni-plated steel sheet may have good corrosion resistance. Thus, said prior art techniques are not ones for producing steel sheet substrates capable of being formed into side body parts of cans having thin walls. In particular, with the expected requirement for much thinned walls of side body parts of 2-piece battery cans in further, it is anticipated that the steel sheet for said cans shall be controlled much more severely not only for preventing the steel sheet from being cracked or wrinkled during forming it into cans but also for reducing inevitable impurities that are inevitably introduced into the steel sheet during its production. Given the situation, none of the above-mentioned prior art techniques could satisfy the requirements for the steel sheet for 2-piece battery cans.

Accordingly, one object of the present invention is to solve the problems with the above-mentioned prior art techniques, and to provide a steel sheet for 2-piece battery cans that can be well formed into 2-piece battery cans through DI molding with excellent formability while satisfying the requirement for thinning the walls of the side body parts of the cans formed.

The other object of the present invention is to provide a steel sheet for 2-piece battery cans, which has excellent formability in DI molding and, after having been formed into cans, still has high mechanical strength and excellent anti-secondary work embrittlement with excellent corrosion resistance, and, in particular, which can be well subjected to DI molding into cylindrical side body parts at an ironing reduction ratio of 70% or higher to have much thinned walls without being cracked at the flanges and without being cracked by ironing and, after having been formed into cans, still has high mechanical strength and excellent anti-secondary work embrittlement with excellent corrosion resistance at the embossed terminals.

DISCLOSURE OF THE INVENTION

In order to obtain steel sheets for 2-piece battery cans having the above-mentioned characteristics, we, the present inventors analyzed the structures of fine impurities existing in cold-rolled, 0.4 mm-thick steel sheets for battery cans, while studying the relationship between the data thus obtained through the analysis and the conditions under which said steel sheets were cracked due to ironing during the DI molding thereof to give cylindrical models corresponding to 2-piece battery cans. As a result of said studies, we have found that the essential factors of causing the ironing cracks are the inevitable impurities of non-metal oxides existing in the steel sheets and also MnS to be precipitated in the steel sheets through the solid phase reaction after the hot-rolling step of producing the steel sheets, and that, in particular, the minor non-metal oxides and sulfides existing in the steel sheets essentially caused the cracking of the body parts and the flange parts of said cylindrical models during the ID molding.

Based on the above-mentioned findings and considering that the control of the impurities of non-metal oxides and sulfides in steel sheets is important for forming said steel sheets into side cylindrical parts of 2-piece battery cans having further thinned walls, we have defined the optimum range of the content of O and S in steel that may govern the absolute amounts of said impurities in steel.

In addition, we have further found that, when B is added to the steel sheets containing O and S within the thus-defined optimum range and when the resulting steel sheets are subjected to DI molding to give cylindrical bodies, the propagation of micro-cracks in the resulting cylindrical bodies can be prevented and the cylindrical bodies can have high mechanical strength. In particular, we have found that, when the steel sheets of that type are ironed to give cylindrical bodies with thin walls, no micro-cracks that may reach the steel sheet substrate are formed in said thin walls whereby the cylindrical bodies having such thin walls with no micro-cracks can have excellent anti-secondary work embrittlement and high mechanical strength and therefore the thin walls can be further thinned, and that the surfaces of the bent and deformed parts of said cylindrical bodies around the terminals to be mounted thereon can have improved corrosion resistance. On the basis of these findings, we have defined the suitable amount of B to be added to the steel sheets for 2-piece battery cans of the invention.

In general, in 2-piece battery cans as produced through DI-molding of steel sheets, micro-cracks formed in the side body parts and also in the bent parts around the terminals are often propagated therethrough even into the steel sheet substrate to thereby worsen the corrosion resistance of the outer surfaces of said cans. Taking this into consideration, we, the present inventors have still further found that, when suitable amounts of Cr and Ni are, either singly or as combined, added to the steel sheet substrate, the corrosion resistance of the outer surfaces can be prevented from being worsened. On the basis of this finding, we have added suitable amounts of Cr and/or Ni to the steel sheets of the invention.

Specifically, the characteristic aspects of the present invention are as follows:

(1) A steel sheet for 2-piece battery cans with excellent formability, which contains S and O (provided that O is the total oxygen content) while satisfying the conditions that S is from 0.005 to 0.015 wt. %, that O is from 0 to 0.0025 wt. % and that $[S/10+O] \leq 0.0035$ wt. %.

(2) A steel sheet for 2-piece battery cans with excellent formability, which contains S and O (provided that O is the total oxygen content) while satisfying the conditions that S is from 0.005 to 0.012 wt. %, that O is from 0 to 0.0025 wt. % and that $[S/10+O] \leq 0.0030$ wt. %.

(3) A steel sheet for 2-piece battery cans with excellent formability, anti-secondary work embrittlement and corrosion resistance, which contains B of from 0.0005 to 0.0015 wt. % while satisfying the condition that $0.2 \leq B/N \leq 1.0$, and contains S and O (provided that O is the total oxygen content) while satisfying the conditions that S is from 0.005 to 0.015 wt. %, that O is from 0 to 0.0025 wt. % and that $[S/10+O] \leq 0.0035$ wt. %.

(4) The steel sheet for 2-piece battery cans with excellent formability, anti-secondary work embrittlement and corrosion resistance of the above-mentioned (3), which contains S and O (provided that O is the total oxygen content) while satisfying the conditions that S is from 0.005 to 0.012 wt. %, that O is from 0 to 0.0025 wt. % and that $[S/10+O] \leq 0.0030$ wt. %.

(5) The steel sheet for 2-piece battery cans with excellent formability, anti-secondary work embrittlement and corrosion resistance of the above-mentioned (3) or (4), which contains one or both of Cr of being from 0.03 to 0.10 wt. % and Ni of being from 0.01 to 0.10 wt. %, the total of the two being 0.10 wt. % or smaller.

(6) A steel sheet for 2-piece battery cans with excellent formability and corrosion resistance, which contains one or both of Cr of being from 0.03 to 0.10 wt. % and Ni of being from 0.01 to 0.10 wt. %, the total of the two being 0.10 wt. % or smaller, and contains S and O (provided that O is the total oxygen content) while satisfying the conditions that S is from 0.005 to 0.015 wt. %, that O is from 0 to 0.0025 wt. % and that $[S/10+O] \leq 0.0035$ wt. %.

(7) The steel sheet for 2-piece battery cans with excellent formability and corrosion resistance of the above-mentioned (6), which contains S and O (provided that O is the total oxygen content) while satisfying the conditions that S is from 0.005 to 0.012 wt. %, that O is from 0 to 0.0025 wt. % and that $[S/10+O] \leq 0.0030$ wt. %.

(8) The steel sheet for 2-piece battery cans with excellent formability and corrosion resistance of the above-mentioned (6) or (7), which contains one or both of Cr of being from 0.05 to 0.10 wt. % and Ni of being from 0.03 to 0.10 wt. %, the total of the two being 0.10 wt. % or smaller.

(9) The steel sheet for 2-piece battery cans of the above-mentioned (1), (2), (3), (4), (5), (6), (7) and (8), of which the both surfaces have at least a Ni plate layer or an Fe—Ni alloy plate layer.

When the steel sheet of the present invention for 2-piece battery cans is formed into 2-piece battery cans through ID molding, it exhibits excellent formability to give well thinned side body parts, and, after having been formed into cans, it has high mechanical strength and excellent anti-secondary work embrittlement and corrosion resistance. In particular, even when the steel sheet of the present invention is formed into 2-piece battery cans, of which the side body parts are much more thinned than those of conventional 2-piece battery cans, the cans thus formed are free from flanging cracks and ironing cracks, while having high mechanical strength and excel lent anti-secondary work embrittlement with excellent corrosion resistance at the embossed terminals and other parts of the cans.

BEST MODES OF CARRYING OUT THE INVENTION

Now, the process that has brought about the present invention, the details of the present invention, and the reasons for defining the ranges of various factors constituting the present invention are described hereinunder.

Figure 1:
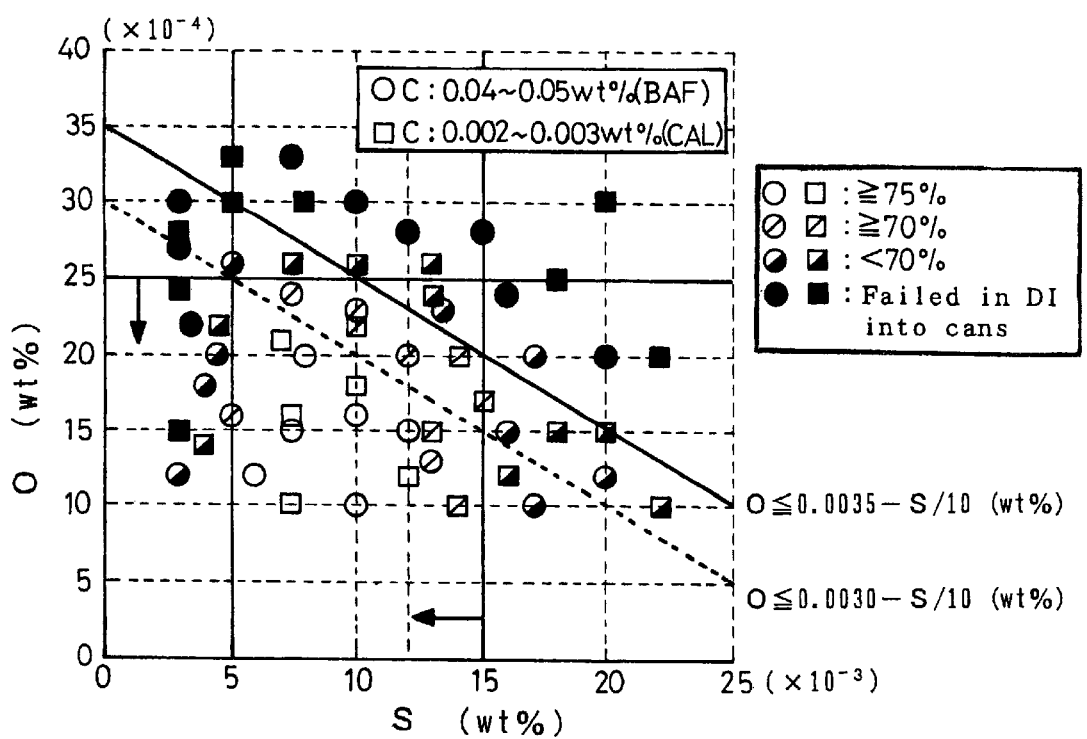
FIG. 1 is a graph showing the relationship between the marginal ironing reduction ratios in ironing for DI molding of steel sheets for 2-piece battery cans, and the amounts of S and O in the steel sheets.

For the necessary cracking resistance in ironing the steel sheet of the present invention for 2-piece battery cans, the amount of S and the amount of O (provided that O is the total oxygen content—the same shall apply hereinunder) to be in the steel sheet of the invention are specifically defined. Various steel sheets containing S and O in different amounts were used for forming 2-piece battery cans, which were those as annealed in box annealing furnaces (BAF) and those as annealed in continuous annealing lines (CAL), and in which "C" indicates the C content of each steel sheet. Each steel sheet was formed into a cylindrical model corresponding to a 2-piece battery can, through DI molding, whereupon the marginal ironing reduction ratio (this is the uppermost limit of the ironing reduction ratio in ironing the steel sheet into the intended can without forming any cracks in the resulting can) was measured. FIG. 1 shows the relationship between said marginal ironing reduction ratio and the amounts of S and O in each steel sheet.

As in FIG. 1, it is known that the marginal ironing reduction ratio is 70% or higher when 0.005 wt. % $\leq$ S $\leq$ 0.015 wt. %, O $\leq$ 0.0025 wt. % and [S/10+O] $\leq$ 0.0035 wt. %, and that the marginal ironing reduction ratio is increased to be 75% or higher when 0.005 wt. % $\leq$ S $\leq$ 0.012 wt. %, O $\leq$ 0.0025 wt. % and [S/10+O] $\leq$ 0.0030 wt. %. The reason why the cracking resistance in ironing the tested steel sheets was low when the S content was less than 0.005 wt. % is because the scaled surface defects of the steel sheets that had resulted from the poor release of scale from said steel sheets during hot-ironing them induced the cracking of the steel sheets during ironing them.

Based on the above-mentioned results, S and O to be in the steel sheet of the present invention are defined to be such that 0.005 wt. % $\leq$ S $\leq$ 0.015 wt. %, that O $\leq$ 0.0025 wt. % (including 0% of O) and that [S/10+O] $\leq$ 0.0035 wt. %, more preferably to be such that 0.005 wt. % $\leq$ S $\leq$ 0.012 wt. %, that O $\leq$ 0.0025 wt. % (including 0% of O) and that [S/10+O] $\leq$ 0.0030 wt. %.

Next, hereinunder referred to is the addition of B to steel sheets that may bring about the increase in the mechanical strength of cans to be formed and also the improvement in the anti-secondary work embrittlement thereof.

Figure 2:
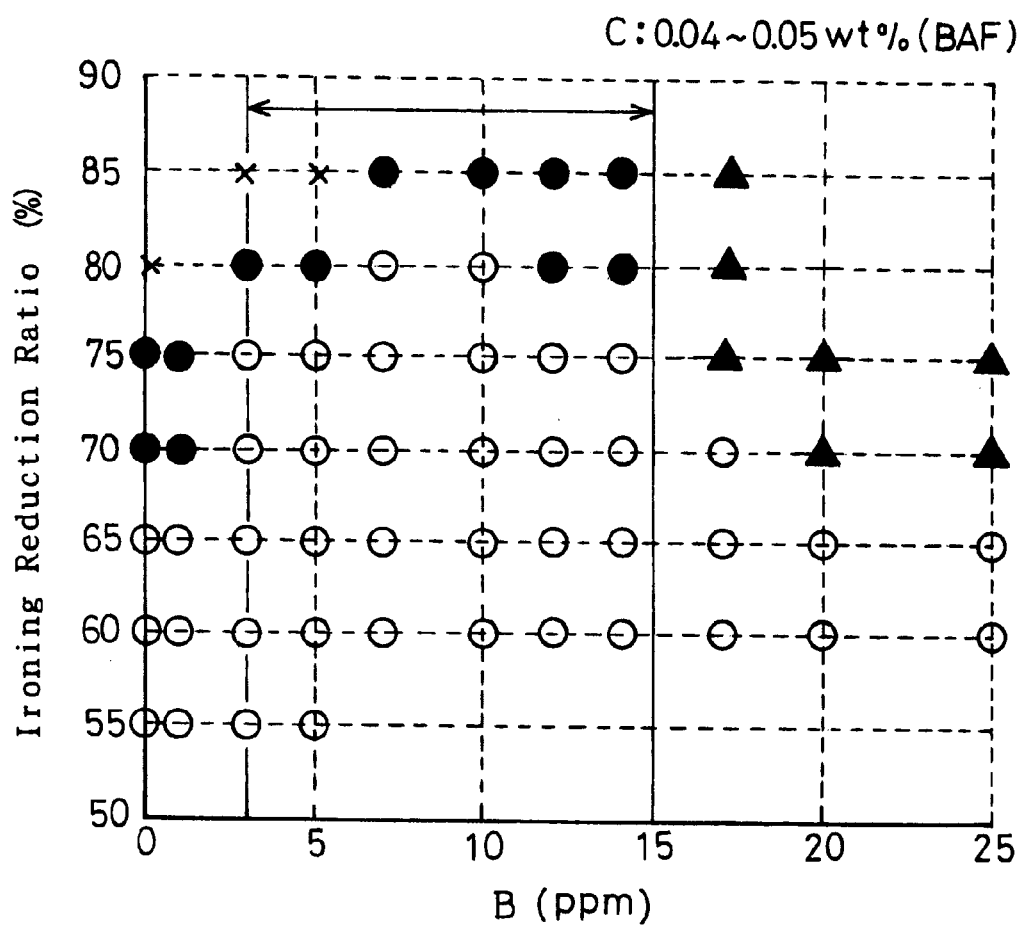
FIG. 2 is a graph showing the relationship between the ironing reduction ratios in ID molding of steel sheets for 2-piece battery cans—said steel sheets having been formed into cylindrical bodies through ID molding at different ironing reduction ratios and thereafter compressed into flat ones, while checking the possibility of the compression of said bodies into completely flat ones without brittle fracture—and the amount of B added to the steel sheets.

Various steel sheets containing S and O in different amounts as controlled within the defined ranges of the present invention (S of from 0.005 to 0.010 wt. %; O of from 0.0010 to 0.0015 wt. %; and [S/10+O] $\leq$ 0.0035 wt. %) and containing B in different amounts were used for forming 2-piece battery cans through DI molding. Briefly, each steel sheet was formed into cylindrical models corresponding to 2-piece battery cans, through DI molding at different ironing reduction ratios, and then these cylindrical models were compressed into flat ones in their lengthwise direction, while being checked as to whether or not they could be compressed into completely flat ones without brittle fracture. From the data, obtained was the marginal ironing reduction ratio in each steel sheet that was formed into the cylindrical model compressed into a completely flat one with no brittle fracture. FIG. 2 shows the data obtained, while showing the relationship between the marginal ironing reduction ratio in each steel sheet and the amount of B added to said steel sheet.

As in FIG. 2, it is known that the addition of B of 0.0003 wt. % or more to the steel sheets significantly improved the anti-secondary work embrittlement of the cylindrical models made of said steel sheets through ID molding at high ironing reduction ratios. The reason for this will be because the addition of B to steel may bring about the i-increase in the intergranular bonding force of ferrite crystals in steel and also the increase in the interfacial bonding force of said crystals to the faces of carbides and others existing in steel whereby micro-cracks formed in the cylindrical bodies are made to be hardly propagated therethrough.

On the other hand, if the B content of steel is larger than 0.0015 wt. %, the strength of the resulting steel sheet substrate is increased. If so, the load to be applied to the sheet for molding it through ID molding shall be enlarged, thereby often resulting in the failure in forming cans from the sheet, for example, giving deformed cans.

Figure 3:
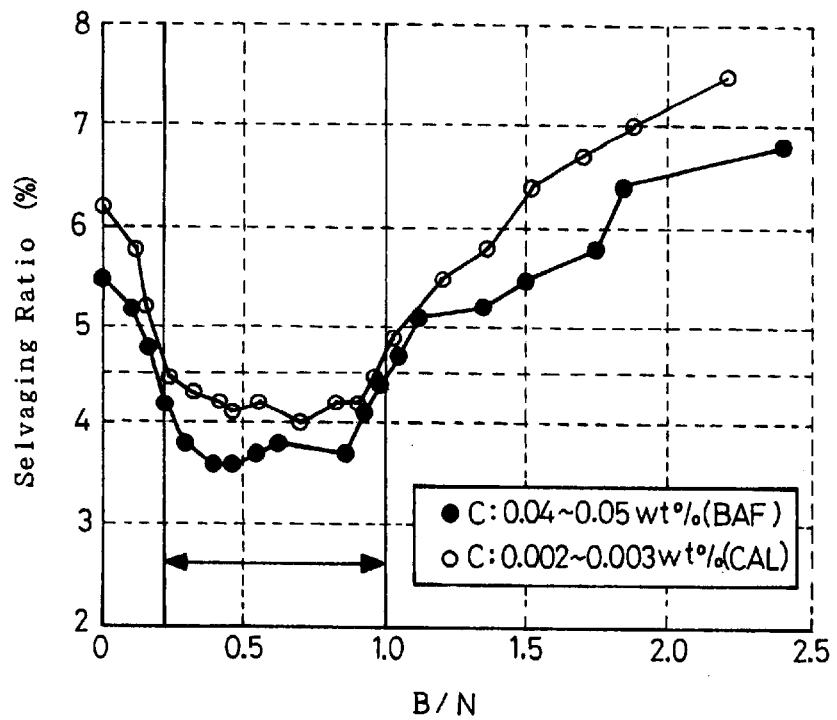
FIG. 3 is a graph showing the relationship between the selvaging ratio in forming steel sheets for 2-piece battery cans into cups at a marginal drawing ratio and a drawing ratio of 1.9, and the ratio of B/N in the steel sheets.

On the other hand, B is helpful, along with Al, in precipitating a minor amount of N existing in steel, in the form of BN to thereby improve the age-hardening ability of a steel sheet and improve the uniformity thereof in the direction of its coiling width. However, if a too large amount of B is added to steel relative to the N content of said steel, such is problematic in that the deep drawability of the resulting steel is lowered and the in-plane anisotropy thereof could not be in a negligible degree. Various steel sheets containing S and O in different amounts as controlled within the defined ranges of the present invention (S of from 0.008 to 0.012 wt. %; O of from 0.0010 to 0.0018 wt. %; and [S/10+O] $\leq$ 0.0030 wt. %), and containing B in different ratios of B/N were formed into cups at a marginal drawing ratio and a drawing ratio of 1.9, whereupon the influence of said B/N on the selvaging ratio in the formation of said cups was checked. FIG. 3 shows the relationship between the selvaging ratio and the ratio of B/N. As in FIG. 3, it is known that the selvaging ratio is lowered when B/N is 0.2 or more. However, if B/N is more than 1.0, the selvaging is again increased.

In general, steel sheets for 2-piece battery cans are plated with Ni, and the thus Ni-plated steel sheets are directly, of after having been subjected to thermal diffusion treatment to thereby convert a part or all of said Ni plate layer into an Fe—Ni alloy plate layer, subjected to DI molding. If the thus-plated steel sheets are ironed for ID molding at an ironing reduction ratio of 70% or higher, or under severer conditions at a higher ironing reduction ratio of 75% or higher, the Ni plate layer or the Fe—Ni alloy plate layer on the surface of the steel sheet is broken, and in addition, the lubricity between the can being ironed and the ironing die is worsened whereby the plate layer is cracked to have hairy micro-cracks. In this condition, the Ni plate layer or the Fe—Ni alloy plate layer could not satisfactorily exhibit its corrosion resistance-improving ability.

We, the present inventors have found that the addition of B to steel is effective also for preventing such hairy micro-cracks that are inevitable in ironing steel sheets at such a high ironing reduction ratio—said hairy micro-cracks being formed while starting from the intergranular region of crystals constituting the steel substrate or from the interface between said crystals and the second phase of carbides or the like existing in the steel substrate—and is therefore effective for improving the corrosion resistance of steel sheets to be ironed. Accordingly, from this viewpoint, it is known that the addition of a suitable amount of B to steel brings about the increase in the marginal ironing reduction ratio in forming steels sheets into 2-piece battery cans through ironing.

Figure 4:
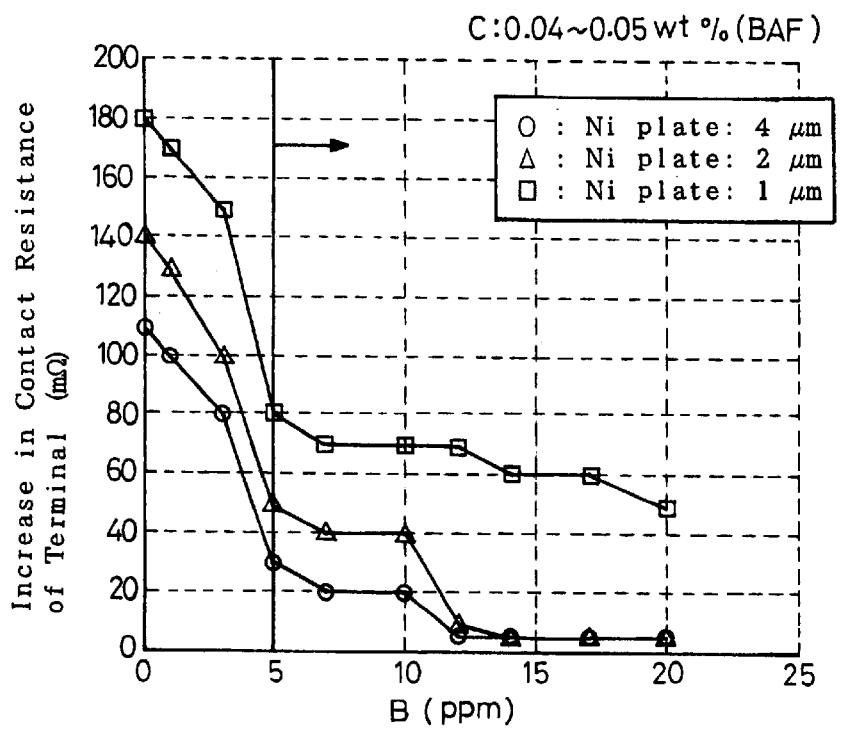
FIG. 4 is a graph showing the relationship between the corrosion resistance of the terminal part as mounted on cylindrical bodies formed through DI molding of steel sheets for 2-piece battery cans, said corrosion resistance being represented by the increase in the contact resistance value of the terminal part, and the amount of B added to the steel sheets.

In order to analyze the influence of B added to steel sheets for 2-piece battery cans on the corrosion resistance of said steel sheets, various steel sheets containing S and O in different amounts as controlled within the defined ranges of the present invention (S of from 0.008 to 0.012 wt. %; O of from 0.0010 to 0.0018 wt. %; and $[S/10+O] \leq 0.0030$ wt. %), and containing B in different amounts were prepared, and plated with Ni at different thicknesses of 1 $\mu$m, 2 $\mu$m and 4 $\mu$m. These steel sheets were formed into cylindrical models corresponding to 2-piece battery cans, through DI molding, and the thus-formed cylindrical models were stored at 32° C. and 85% RH for 100 hours, whereupon the increase in the contact resistance of the terminal part of each model was measured. Based on the thus-measured data, the corrosion resistance of the terminal part was evaluated. FIG. 4 shows the relationship between the increase in the contact resistance value of the terminal part and the amount of B added to each steel sheet, in which it is known that the samples having a B content of not larger than 0.0005 wt. % had a greatly increased contact resistance value at their terminals. This suggests that the improvement in the toughness (anti-secondary work embrittlement) of the steel sheet substrate attained by the addition of B to steel, which is shown in FIG. 2, effectively brings about the absence of hairy micro-cracks in battery cans at the terminals and side body parts thereof, said battery cans being formed through ID molding of steel sheets. Thus, the addition of a suitable amount of B to steel is effective for preventing the increase in the contact resistance of steel under high-temperature and high-humidity conditions and for increasing the corrosion resistance of steel.

As in FIG. 2, the addition of B of 0.0003 wt. % or more to steel may improve the anti-secondary work embrittlement of the steel sheet. As in FIG. 4, however, the improvement in the corrosion resistance of steel is significant when the amount of B to be added to steel is 0.0005 wt. % or more. Therefore, considering the fact that the corrosion resistance is an extremely important requirement for 2-piece battery cans to which the present invention is directed, the lowermost limit of the amount of B to be added to steel is defined to be 0.0005 wt. % in the present invention. On the other hand, as in FIG. 2, if the amount of B added to steel is larger than 0.0015%, the addition of such a large amount of B to steel often brings about the failure in forming steel sheets into cans. For this reason, the uppermost limit of B to be added to steel is defined to be 0.0015 wt. % in the present invention. In addition, based on the data shown in FIG. 3, the amount of B (wt. %) and the amount of N (wt. %) to be added to steel are defined to fall within the range of B/N of being from 0.2 to 1.0.

Now, the results of our studies to analyze the improvement in the corrosion resistance of steel due to the addition of Ni and/or Cr to steel are referred to hereinunder.

We, the present inventors have noted that, when a steel sheet as plated with a plate layer such as that mentioned hereinabove is ironed at a high ironing reduction ratio (for example, at 75% or higher), it shall inevitably have hairy micro-cracks, or that is, those to be formed while starting from the intergranular region in the crystals constituting the steel sheet substrate or starting from the interface between the crystals and the second phase of carbides or the like existing in the steel sheet substrate, and that the fractures of the plate layer at said hairy micro-cracks promote not only the corrosion of the outer surfaces of the cans formed from the steel sheet but also the increase in the contact resistance of the terminal parts of said cans to thereby worsen the corrosion resistance of the bodies of the cans. On the basis of these findings, suitable amounts of C and/or Ni are added to the steel sheet substrate in the present invention, by which is prevented the worsening of the corrosion resistance of steel sheets to be caused by the damage of the surfaces of said steel sheets as ironed through DI molding to give cans.

Figure 5:
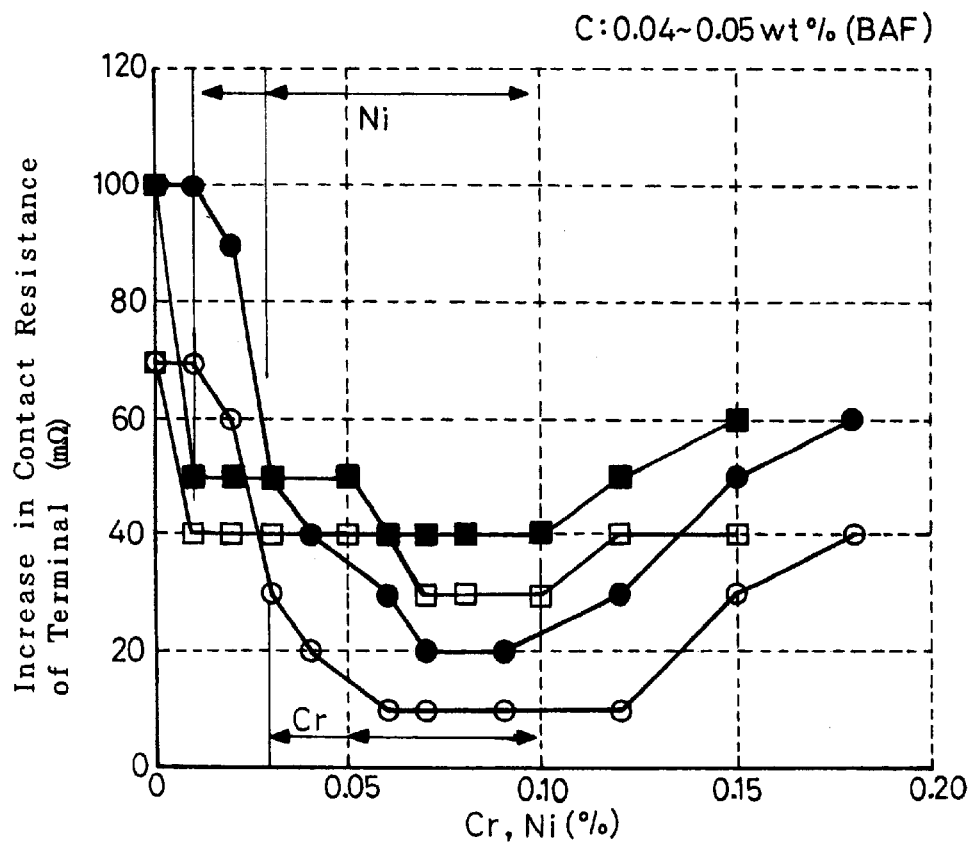
FIG. 5 is a graph showing the relationship between the corrosion resistance of the terminal part as mounted on cylindrical bodies formed through DI molding of B-free steel sheets for 2-piece battery cans, said corrosion resistance being represented by the increase in the contact resistance value of the terminal part, and the amount of Ni or Cr added to the steel sheets.

In order to analyze the influence of Ni and/or Cr added to steel sheets for 2-piece battery cans (B-free steel sheets for 2-piece battery cans) on the corrosion resistance of said steel sheets, various steel sheets (B-free steel sheets) containing S and O in different amounts as controlled within the defined ranges of the present invention (S of from 0.008 to 0.012 wt. %; O of from 0.0010 to 0.0018 wt. %; and $[S/10+O] \leq 0.0035$ wt. %), and containing Ni or Cr in different amounts were prepared, and plated with Ni at different thicknesses of 2 $\mu$m and 4 $\mu$m. These steel sheets were formed into cylindrical models corresponding to 2-piece battery cans, through DI molding, and the thus-formed cylindrical models were stored at 32° C. and 85% RH for 100 hours, whereupon the increase in the contact resistance of the terminal part of each model was measured. Based on the thus-measured data, the corrosion resistance of the terminal part was evaluated. FIG. 5 shows the relationship between the increase in the contact resistance value of the terminal part and the amount of Ni or Cr added to each steel sheet, in which it is known that, in the samples having a Cr content of not smaller than 0.03 wt. % (preferably, not smaller than 0.05 wt. %) or having an Ni content of not smaller than 0.01 wt. % (preferably, not smaller than 0.03 wt. %), the corrosion resistance of the outer surfaces of the terminals was effectively improved.

However, the addition of Cr of larger than 0.10 wt. % to steel brings about the formation of a dense film of Cr oxides on the outermost surface of the steel sheet substrate, and said film worsens the adhesiveness between the Ni or the like plate layer and the steel sheet substrate, thereby worsening the corrosion resistance of the plated steel sheet. On the other hand, the addition of Ni of larger than 0.10 wt. % to steel brings about the increase in the strength of the steel sheet substrate. If so, the pressure to be applied to the surface of the steel sheet for ironing it shall be enlarged, thereby often resulting in the failure in forming cans from the sheet, for example, giving deformed cans.

For the above-mentioned reasons, the amounts of Cr and/or Ni to be added to steel in the present invention are defined to be such that Cr is from 0.03 to 0.10 wt. %, preferably from 0.05 to 0.10 wt. %, and that Ni is from 0.01 to 0.10 wt. %, preferably from 0.03 to 0.10 wt. %.

If the total amount of Ni and Cr added to steel is larger than 0.10 wt. %, such brings about the increase in the strength of the steel sheet substrate. If so, the pressure to be applied to the surface of the steel sheet for ironing it shall be enlarged, thereby often resulting in the failure in forming cans from the sheet, for example, giving deformed cans. For this reason, the uppermost limit of the total amount of Ni+Cr to be added is defined to be 0.10 wt. %.

Also to B-containing steel sheets for 2-piece battery cans, such as those mentioned hereinabove, Cr and/or Ni may be added either singly or as combined. In the present invention, the addition of Cr and/or Ni to the B-containing steel sheets is to make said steel sheets have good corrosion resistance. This is because even B-containing steel sheets will have hairy micro-cracks such as those mentioned hereinabove, when worked with some tools under some working conditions, and the hairy micro-cracks will propagate into the steel sheet substrate. Said addition of Cr and/or Ni is to evade these disadvantages.

Figure 6:
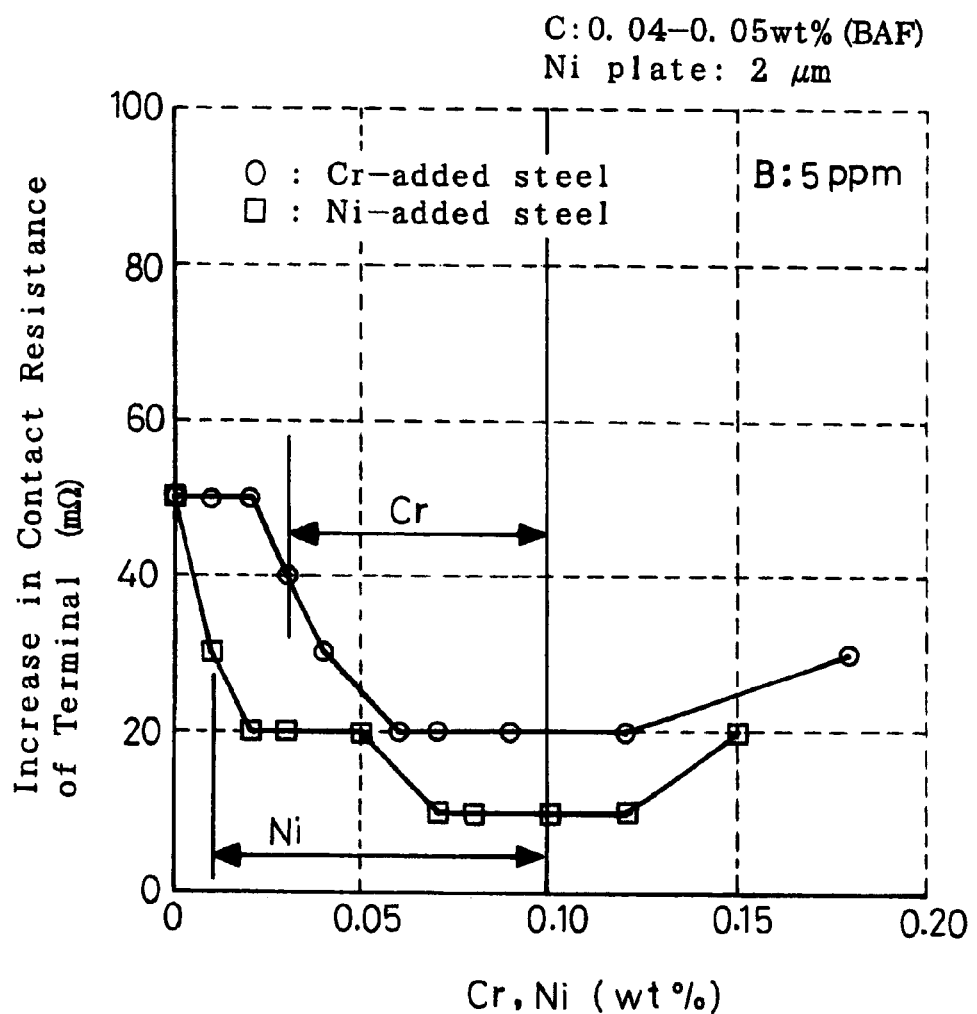
FIG. 6 is a graph showing the relationship between the corrosion resistance of the terminal part as mounted on cylindrical bodies formed through DI molding of B-containing steel sheets for 2-piece battery cans, said corrosion resistance being represented by the increase in the contact resistance value of the terminal part, and the amount of Ni or Cr added to the steel sheets.

In order to analyze the influence of Ni and/or Cr added to B-containing steel sheets for 2-piece battery cans on the corrosion resistance of said steel sheets, various steel sheets containing S, O and B in different amounts as controlled within the defined ranges of the present invention (S of from 0.008 to 0.012 wt. %; O of from 0.0010 to 0.0018 wt. %; [S/10+O]≦0.0035 wt. %; and B of 0.0005 wt. %), and containing Ni or Cr in different amounts were prepared, and plated with Ni at a thickness of 2 $\mu$m. These steel sheets were formed into cylindrical models corresponding to 2-piece battery cans, through DI molding, and the thus-formed cylindrical models were tested under the same conditions as those employed hereinabove to obtain the data in FIG. 4. Based on the data obtained in said test, the corrosion resistance of the terminal part of each sample was evaluated. FIG. 6 shows the relationship between the increase in the contact resistance value of the terminal part and the amount of Ni or Cr added to each steel sheet, in which it is known that the corrosion resistance of the samples having a Cr content of not smaller than 0.03 wt. % or having an Ni content of not smaller than 0.01 wt. % was much better than that of the samples containing only B with neither Ni nor Cr.

However, as in the B-free steel sheets of the present invention mentioned above, the addition of Cr of larger than 0.10 wt. % to steel brings about the formation of a dense film of Cr oxides on the outermost surface of the steel sheet substrate, and said film worsens the adhesiveness between the Ni or the like plate layer and the steel sheet substrate, thereby worsening the corrosion resistance of the plated steel sheet. On the other hand, the addition of Ni of larger than 0.10 wt. % to steel brings about the increase in the strength of the steel sheet substrate. If so, the pressure to be applied to the surface of the steel sheet for ironing it shall be enlarged, thereby often resulting in the failure in forming cans from the sheet, for example, giving deformed cans.

For the above-mentioned reasons, the amounts of Cr and/or Ni to be added to the B-containing steel sheet of the present invention for 2-piece battery cans are defined to be such that Cr is from 0.03 to 0.10 wt. % and that Ni is from 0.01 to 0.10 wt. %.

However, if the total amount of Ni and Cr added to the steel sheet is larger than 0.10 wt. %, such brings about the increase in the strength of the steel sheet substrate. If so, the pressure to be applied to the surface of the steel sheet for ironing it shall be enlarged, thereby often resulting in the failure in forming cans from the sheet, for example, giving deformed cans. For this reason, the uppermost limit of the total amount of Ni+Cr to be added is defined to be 0.10 wt. %.

The intended effects of the present invention can be attained even though the elements constituting the steel sheet of the invention, other than those referred to hereinabove, are not specifically defined. However, in view of the DI moldability of the steel sheet of the invention, it is not preferred that the strength of the steel sheet is too high over the necessary level and that a too much amount of C exists in the steel sheet in the form of its solid solution, since such will interfere with the formation of the steel sheet of the invention into good 2-piece battery cans. For these reasons, in the present invention, the ranges of the essential elements constituting steel are preferably defined as follows:

C; C is an extremely important element in steel, as ensuring the mechanical strength, including the pressure-resistant strength, the panel strength and the buckling strength, for 2-piece battery cans on the necessary level. In steel, the part of C of more than 0.02 wt. % is precipitated to give cementite in communities as extending in the rolling direction of steel; and the part of C of not more than 0.02 wt. % is precipitated, while being annealed, to give cementite ($Fe_3C$) in the intergranular or intragranular region of ferrite. In this condition, the interface between said carbide and the mother phase in steel will often be the area from which the steel starts to be cracked. In particular, if steel sheets are prepared through continuous annealing of ordinary low-carbon steel, the solid solution of C often remains still in the annealed steel sheets to be problematic in the strain aging of the sheets. Even though the solid solution of C existing in steel is completely precipitated through box annealing of the steel, any excess C still existing in the annealed steel will result in the increase in the proportion of the volume of cementite or pearlite therein, thereby increasing the level of the mechanical strength of the steel. Therefore, in order to make the present invention produce the best results, it is desirable to define the uppermost limit of the C content of the steel sheet of the invention from the above-mentioned viewpoints. For this, the uppermost limit of the C content of the steel sheet of the present invention is preferably 0.03 wt. % or lower (including 0%) where the steel sheet substrate is one prepared through continuous annealing, and is preferably 0.06 wt. % or lower (including 0%) where the steel sheet substrate is one prepared through box annealing.

Si; If a too much amount of Si is in steel sheets, such interfere with the Ni-platability of steel sheets. Therefore, the Si content of the steel sheet of the present invention is preferably not larger than 0.03 wt. % (including 0%).

Mn; Mn acts to precipitate S in steel in the form of MnS, thereby preventing hot-tearing of steel slabs. From this viewpoint, Mn is an indispensable element in steel. However, Mn is not always preferred in steel for its corrosion resistance. In particular, from the viewpoint of ensuring the corrosion resistance of battery cans made of steel, it is desired to minimize the Mn content of steel. For this, it is preferable that the lowermost limit of Mn to be in the steel sheet of the present invention is 0.1 wt. % which is the minimum amount necessary for the precipitation and fixation of S in steel, and that its uppermost limit is 0.3 wt. % from the viewpoint of ensuring the corrosion resistance and the platability with Ni or the like of the steel sheet of the invention.

P; From the viewpoint of the platability with Ni or the like of steel, the P content of steel is preferably as small as possible. However, if the P content of steel is not larger than 0.02 wt. %, such does not have any negative influence on the practical use of steel. For this reason, it is desirable that the P content of the steel sheet of the present invention is not larger than 0.02 wt. % (including 0%).

S and O; As so mentioned hereinabove, S and O are especially important elements, and their amounts to be in the steel sheet of the present invention for 2-piece battery cans must be specifically defined. Of the two, S exists in steel in the form of MnS, which is often the starting point from which cracks of 2-piece battery cans start in their formation through ironing of steel sheets. On the other hand, O exists in steel essentially in the form of an impurity of $Al_2O_3$ (but rarely in the form of impurities of CaO and MnO), and such oxide impurities promote, along with MnS, cracking of steel during DI molding of steel to give steel cans. Therefore, the amount of S and the amount of O (as the total oxygen content) to be in the steel sheet of the present invention are defined to fall within the above-mentioned ranges, on the basis of the data shown in FIG. 1. sol. Al; Sol. Al acts to precipitate N in steel in the form of AlN, which reduces the harmful influence of the solid solution of N in steel, said solid solution of N being one to lower the local ductility of steel sheets owing to its own dynamic strain aging phenomenon, like the solid solution of C in steel. However, if a too much amount of Al is added to steel in order to increase the amount of the solid solution of Al in steel, such often brings about the formation of the impurity of fine $Al_2O_3$ particles that remain in steel, and the presence of the impurity in steel promotes cracking of steel cans to be formed through DI molding of steel. For these reasons, it is preferable that the lowermost limit of sol. Al to be in the steel sheet of the present invention is 0.01 wt. % which is the minimum amount necessary for the precipitation of N in the steel sheet in the form of AlN, and that its uppermost limit is 0.10 wt. % in order not to interfere with the formability of the steel sheet into 2-piece battery cans.

N; N in steel may be precipitated therein in the form of AlN or BN thereby having no negative influence on steel. However, the N content of steel is preferably as small as possible for the technology of steel production. Therefore, it is generally preferable that the steel sheet of the present invention has an N content of not larger than 0.004 wt. % (including 0%)

The both surfaces of the steel sheet of the present invention are generally coated with a corrosion-resistant layer, such as a metal plate layer and/or an alloy plate layer, in order that said corrosion-resistant layer can ensure the corrosion resistance of the steel sheet when the steel sheet is formed into 2-piece battery cans. The metal plate layer and the alloy plate layer to be employed for this purpose are not specifically defined but may be any ones capable of ensuring the corrosion resistance of the steel sheet coated therewith. For example, the both surfaces of the steel sheet may be coated with a single-layered or multi-layered metal plate layer and/or an alloy plate layer to be formed through thermal diffusion treatment of said metal plate layer.

However, in order to make the steel sheet have especially excellent corrosion resistance, it is desirable to provide at least an Ni plate layer or an Fe—Ni alloy plate layer on the both surfaces of the steel sheet. The Fe—Ni alloy plate layer is obtained through thermal diffusion treatment of an Ni plate layer, in which all the Ni plate layer may be completely alloyed or, alternatively, only the lower part of the Ni plate layer may be partly alloyed. If desired, an additional Ni plate layer may be provided over the Fe—Ni alloy plate layer to give a composite layer structure. Anyway, in order to ensure the especially excellent corrosion resistance of the steel sheet of the present invention by combining the corrosion resistance of the steel sheet substrate and that of the plate layer formed on said substrate, it is desirable that the both surfaces of the steel sheet substrate are coated with at least one plate layer of such an Ni plate layer and/or an Fe—Ni alloy plate layer. If desired, an additional Sn plate layer may be provided over said Ni plate layer and/or Fe—Ni alloy plate layer, thereby further enhancing the corrosion resistance of the thus-plated steel sheet.

The steel sheet of the present invention for 2-piece battery cans is not limited to the use in DI molding, but may be applied to ordinary drawing.

EXAMPLES

Example 1

Steel No. 1 to No. 20 shown in Table 1 and Table 2 were formed in ingots, which were then cast in a continuous casting system to give cast steel plates. These were heated at 1200° C., and hot-rolled into steel strips having a thickness of 2.3 mm. In said hot-rolling, the temperature for finishing the steel strips was 870° C. and that for taking up these was 560° C. The thus hot-rolled steel sheets were washed with an acid, then cold-rolled to have a thickness of 0.5 mm or 0.4 mm, and thereafter annealed in a box annealing furnace at 650° C. for recrystallizing them. The thus-annealed steel sheets were then quench-rolled, thereafter plated with Ni, and heated at 650° C. for thermal diffusion of the Ni plate layer. These steel sheets were blanked to give circular discs, which were then deep-drawn and ironed to give cylindrical cans having a wall thickness of from 0.18 to 0.08 mm. These cylindrical cans are the models of 2-piece battery cans. The marginal ironing reduction ratio in forming each cylindrical can, the anti-secondary work embrittlement of each can, the selvaging ratio of each sample, and the corrosion resistance of the terminal part of each can were determined. The data obtained are shown in Table 3 and Table 4.

To determine the anti-secondary work embrittlement of each sample, the side body part of each sample was compressed in its lengthwise direction to be flattened, whereupon it was checked as to whether or not the part was completely flattened with no brittle fracture, and the marginal ironing reduction ratio in giving the sample that had been completely flattened in this test with no brittle fracture was recorded. The anti-secondary work embrittlement of each sample was represented by the thus-recorded marginal ironing reduction ratio. To determine the corrosion resistance of the terminal part of each sample, the samples were stored at 32° C. and 85% RH for 100 hours, and thereafter the contact resistance value of the terminal part of each sample thus stored was measured. The corrosion resistance in question was represented by the increase in the contact resistance value of the terminal part of each stored sample.

As in Table 3 and Table 4, it is known that the steel No. 1 to No. 5, No. 8, No. 10 to No. 15, and No. 17 to No. 20, in which the amounts of S and O were within the scopes defined in the present invention, produced high marginal ironing reduction ratios. It is also known that the steel No. 3 to No. 5, No. 8, No. 10, No. 11, No. 15, No. 18 and No. 19, in which the amounts of S and O were within the scopes defined in the present invention and to which had been added B in an amount falling within the scope defined in the present invention, produced high marginal ironing reduction ratios and had effectively improved anti-secondary work embrittlement. In these, in addition, the increase in the contact resistance value of the terminals was small, and their corrosion resistance was effectively improved.

Example 2

Steel No. 21 to No. 30 shown in Table 5 were formed in ingots, which were then cast in a continuous casting system to give cast steel plates. These were heated at 1200° C., and hot-rolled into steel strips having a thickness of 2.3 mm. In said hot-rolling, the temperature for finishing the steel strips was 890° C. and that for taking up these was 640° C. The thus hot-rolled steel sheets were washed with an acid, then cold-rolled to have a thickness of 0.5 mm or 0.4 mm, and thereafter annealed in a continuous annealing line at 720° C. for recrystallizing them. The thus-annealed steel sheets were then quench-rolled, thereafter plated with Ni, and heated at 6500° C. for thermal diffusion of the Ni plate layer. These steel sheets were blanked to give circular discs, which were then deep-drawn and ironed to give cylindrical cans having a wall thickness of from 0.18 to 0.08 mm. These cylindrical cans are the models of 2-piece battery cans. The marginal ironing reduction ratio in forming each cylindrical can, the anti-secondary work embrittlement of each can, the selvaging ratio of each sample, and the corrosion resistance of the terminal part of each can were determined. The data obtained are shown in Table 6.

The evaluation of the anti-secondary work embrittlement of each sample and the corrosion resistance of its terminal part was made in the same manner as in Example 1.

As in Table 6, it is known that the steel No. 21 to No. 23, and No. 26 to No. 30, in which the amounts of S and O were within the scopes defined in the present invention, produced high marginal ironing reduction ratios. It is also known that the steel No. 23, No. 26, No. 27, No. 29 and No. 30, in which the amounts of S and O were within the scopes defined in the present invention and to which had been added B in an amount falling within the scope defined in the present invention, produced high marginal ironing reduction ratios and had effectively improved anti-secondary work embrittlement. In these, in addition, the increase in the contact resistance value of the terminals was small, and their corrosion resistance was effectively improved.

Example 3

Steel No. 31 to No. 40 shown in Table 7 were formed in ingots, which were then cast in a continuous casting system to give cast steel plates. These were heated at 1200° C., and hot-rolled into steel strips having a thickness of 2.0 mm. In said hot-rolling, the temperature for finishing the steel strips was from 870 to 900° C. and that for taking up these was from 560 to 680° C. The thus hot-rolled steel sheets were washed with an acid, then cold-rolled to have a thickness of 0.5 mm, and thereafter annealed in a box annealing furnace at 650° C. or in a continuous annealing line at 720° C. for recrystallizing them. The thus-annealed steel sheets were then quench-rolled, and thereafter plated with Ni. These steel sheets were blanked to give circular discs, which were then deep-drawn and ironed to give cylindrical cans having a wall thickness of from 0.18 to 0.08 mm. These cylindrical cans are the models of 2-piece battery cans. The marginal ironing reduction ratio in forming each cylindrical can, the anti-secondary work embrittlement of each can, the selvaging ratio of each sample, and the corrosion resistance of the terminal part of each can were determined. The data obtained are shown in Table 8.

The evaluation of the anti-secondary work embrittlement of each sample and the corrosion resistance of its terminal part was made in the same manner as in Example 1.

As in Table 8, it is known that the steel No. 31, No. 33, No. 34, No. 37, and No. 38 to No. 40, in which the amounts of S and O were within the scopes defined in the present invention and to which had been added B along with Ni and/or Cr each in an amount falling within the scope defined in the present invention, produced high marginal ironing reduction ratios and had effectively improved anti-secondary work embrittlement. In these, in addition, the increase in the contact resistance value of the terminals was small, and their corrosion resistance was effectively improved.

Example 4

Steel No. 41 to No. 54 shown in Table 9 were formed in ingots, which were then cast in a continuous casting system to give cast steel plates. These were heated at 1200° C., and hot-rolled into steel strips having a thickness of 2.3 mm. In said hot-rolling, the temperature for finishing the steel strips was 870° C and that for taking up these was 560° C. The thus hot-rolled steel sheets were washed with an acid, then cold-rolled to have a thickness of 0.5 mm, and thereafter annealed in a box annealing furnace at 650° C. for recrystallizing them. The thus-annealed steel sheets were then quench-rolled, thereafter plated with Ni, and then heated at 650° C. for thermal diffusion of the Ni plate layer. These steel sheets were blanked to give circular discs, which were then deep-drawn and ironed to give cylindrical cans having a wall thickness of from 0.18 to 0.08 mm. These cylindrical cans are the models of 2-piece battery cans. The marginal ironing reduction ratio in forming each cylindrical can, and the corrosion resistance of the terminal part of each can were determined. The data obtained are shown in Table 10.

The evaluation of the corrosion resistance of the terminal part of each sample was made in the same manner as in Example 1.

As in Table 10, it is known that the steel No. 43, No. 44, No. 47, No. 49 to No. 51, and No. 53, in which the amounts of S and O were within the scopes defined in the present invention and to which had been added Cr and/or Ni each in an amount falling within the scope defined in the present invention, produced high marginal ironing reduction ratios. In these, in addition, the increase in the contact resistance value of the terminals was small, and their corrosion resistance was effectively improved.

Example 5

Steel No. 55 to No. 63 shown in Table 11 were formed in ingots, which were then cast in a continuous casting system to give cast steel plates. These were heated at 1200° C., and hot-rolled into steel strips having a thickness of 2. 3 mm. In said hot-rolling, the temperature for finishing the steel strips was 890° C. and that for taking up these was 640° C. The thus hot-rolled steel sheets were washed with an acid, then cold-rolled to have a thickness of 0.4 mm, and thereafter annealed in a continuous annealing line at 720° C. for recrystallizing them. The thus-annealed steel sheets were then quench-rolled, thereafter plated with Ni, and then heated at 650° C. for thermal diffusion of the Ni plate layer. These steel sheets were blanked to give circular discs, which were then deep-drawn and ironed to give cylindrical cans having a wall thickness of from 0.18 to 0.08 mm. These cylindrical cans are the models of 2-piece battery cans. The marginal ironing reduction ratio in forming each cylindrical can, and the corrosion resistance of the terminal part of each can were determined. The data obtained are shown in Table 12.

The evaluation of the corrosion resistance of the terminal part of each sample was made in the same manner as in Example 1.

As in Table 12, it is known that the steel No. 56, No. 58, and No. 60 to No. 62, in which the amounts of S and O were within the scopes defined in the present invention and to which had been added Cr and/or Ni each in an amount falling within the scope defined in the present invention, produced high marginal ironing reduction ratios. In these, in addition, the increase in the contact resistance value of the terminals was small, and their corrosion resistance was effectively improved.

INDUSTRIAL APPLICABILITY

The steel sheet of the present invention is suitable as the material to be formed into 2-piece battery cans. In particular, it is suitable as the material to be formed, through DI molding, into side body parts of 2-piece battery cans.

TABLE 1

| (A) | C | Si | Mn | P | S | Sol.Al | N | B | B/N | O | S/10 + O |
|---|---|---|---|---|---|---|---|---|---|---|---|
| 1 | 0.058 | 0.02 | 0.25 | 0.018 | 0.012 | 0.033 | 0.0023 | — * | — | 0.0021 | 0.0033 |
| 2 | 0.055 | 0.01 | 0.22 | 0.015 | 0.013 | 0.041 | 0.0021 | 0.0002 | 0.10 | 0.0021 | 0.0034 |
| 3 | 0.054 | 0.02 | 0.21 | 0.014 | 0.011 | 0.054 | 0.0022 | 0.0006 | 0.27 | 0.0018 | 0.0029 |
| 4 | 0.051 | 0.02 | 0.23 | 0.016 | 0.012 | 0.051 | 0.0019 | 0.0012 | 0.63 | 0.0021 | 0.0033 |
| 5 | 0.052 | 0.01 | 0.35 | 0.014 | 0.013 | 0.048 | 0.0022 | 0.0006 | 0.27 | 0.0019 | 0.0032 |
| 6 | 0.053 | 0.02 | 0.22 | 0.016 | 0.011 | 0.035 | 0.0018 | 0.0008 | 0.44 | 0.0031 | 0.0042 |
| 7 | 0.044 | 0.01 | 0.21 | 0.011 | 0.017 | 0.044 | 0.0025 | 0.0011 | 0.44 | 0.0018 | 0.0035 |
| 8 | 0.042 | 0.02 | 0.17 | 0.014 | 0.012 | 0.054 | 0.0028 | 0.0011 | 0.39 | 0.0021 | 0.0033 |
| 9 | 0.044 | 0.01 | 0.15 | 0.013 | 0.013 | 0.077 | 0.0029 | — * | — | 0.0024 | 0.0037 |
| 10 | 0.041 | 0.01 | 0.17 | 0.011 | 0.009 | 0.074 | 0.0031 | 0.0008 | 0.26 | 0.0019 | 0.0028 |

Note: The data underlines or those marked with * are outside the scope of the invention.
(A) : Steel No.
(B) : Constitutive Component (wt. %, except for B/N)

TABLE 2

| (A) | C | Si | Mn | P | S | Sol.Al | N | B | B/N | O | S/10 + O |
|---|---|---|---|---|---|---|---|---|---|---|---|
| 11 | 0.043 | 0.01 | 0.06 | 0.011 | 0.005 | 0.082 | 0.0021 | 0.0005 | 0.24 | 0.0015 | 0.0020 |
| 12 | 0.042 | 0.01 | 0.16 | 0.012 | 0.008 | 0.069 | 0.0028 | 0.0019 | 0.68 | 0.0021 | 0.0029 |
| 13 | 0.036 | 0.01 | 0.16 | 0.014 | 0.011 | 0.075 | 0.0028 | — * | — | 0.0019 | 0.0030 |
| 14 | 0.035 | 0.02 | 0.28 | 0.015 | 0.009 | 0.033 | 0.0028 | 0.0002 | 0.07 | 0.0023 | 0.0032 |
| 15 | 0.031 | 0.02 | 0.22 | 0.018 | 0.008 | 0.038 | 0.0024 | 0.0006 | 0.25 | 0.0017 | 0.0025 |
| 16 | 0.025 | 0.01 | 0.21 | 0.009 | 0.003 | 0.041 | 0.0026 | 0.0006 | 0.23 | 0.0024 | 0.0027 |
| 17 | 0.025 | 0.02 | 0.26 | 0.008 | 0.012 | 0.042 | 0.0018 | 0.0001 | 0.06 | 0.0021 | 0.0033 |
| 18 | 0.022 | 0.01 | 0.25 | 0.007 | 0.012 | 0.044 | 0.0019 | 0.0006 | 0.32 | 0.0018 | 0.0030 |
| 19 | 0.017 | 0.01 | 0.21 | 0.011 | 0.009 | 0.047 | 0.0022 | 0.0013 | 0.59 | 0.0013 | 0.0022 |
| 20 | 0.015 | 0.01 | 0.24 | 0.015 | 0.010 | 0.046 | 0.0023 | 0.0021 | 0.91 | 0.0017 | 0.0027 |

Note: The data underlines or those marked with * are outside the scope of the invention.
(A) : Steel No.
(B) : Constitutive Components (wt. %, except for B/N)

TABLE 3

| (A) | (C) (%) | (D) (%) *1 | (E) (%) | (F) (mΩ) *2 |
|---|---|---|---|---|
| 1 | 72 | 65 | 5.7 | 140 |
| 2 | 70 | 65 | 5.4 | 110 |
| 3 | 78 | 75 | 4.3 | 30 |
| 4 | 76 | 75 | 3.5 | 20 |
| 5 | 72 | 70 | 4.0 | 50 |
| 6 | (G) | — | 3.7 | 40 |
| 7 | 64 | 50 | 3.6 | 30 |
| 8 | 76 | 75 | 3.2 | 20 |
| 9 | 66 | 60 | 5.8 | 100 |
| 10 | 80 | 75 | 3.8 | 40 |

*1 : This indicates the anti-secondary work embrittlement of the sample.
*2 : This indicates the corrosion resistance of the sample.
(A) : Steel No.
(C) : Marginal Ironing Reduction Ratio
(D) : Marginal Ironing Reduction Ratio, at which the sample produced no brittle fracture when its side cylindrical part was compressed to be flattened
(E) : Selvaging Ratio
(F) : Increase in Contact Resistance Value of Terminal Part
(G) : Failed in DI into cans.

TABLE 4

| (A) | (C) (%) | (D) (%) *1 | (E) (%) | (F) (mΩ) *2 |
|---|---|---|---|---|
| 11 | 85 | 85 | 3.9 | 8 |
| 12 | 72 | 65 | 3.6 | 8 |
| 13 | 72 | 60 | 5.7 | 130 |
| 14 | 70 | 65 | 5.0 | 90 |
| 15 | 82 | 80 | 3.5 | 40 |
| 16 | (G) | — | 3.6 | 30 |
| 17 | 72 | 65 | 5.2 | 80 |
| 18 | 76 | 75 | 4.0 | 40 |
| 19 | 84 | 80 | 3.8 | 20 |
| 20 | 74 | 65 | 4.1 | 10 |

*1 : This indicates the anti-secondary work embrittlement of the sample.
*2 : This indicates the corrosion resistance of the sample.
(A) : Steel No.
(C) : Marginal Ironing Reduction Ratio
(D) : Marginal Ironing Reduction Ratio, at which the sample produced no brittle fracture when its side cylindrical part was compressed to be flattened
(E) : Selvaging Ratio
(F) : Increase in Contact Resistance Value of Terminal Part
(G) : Failed in DI into cans.

TABLE 5

| (A) | C | Si | Mn | P | S | Sol.Al | N | (B) B | B/N | O | S/10 + O | Cr | Ni | (H) |
|---|---|---|---|---|---|---|---|---|---|---|---|---|---|---|
| 21 | 0.005 | 0.02 | 0.23 | 0.018 | 0.011 | 0.038 | 0.0017 | — * | — | 0.0016 | 0.0027 | — | — | — |
| 22 | 0.004 | 0.02 | 0.15 | 0.014 | 0.012 | 0.065 | 0.0019 | <u>0.0004</u> | 0.21 | 0.0021 | 0.0033 | — | — | — |
| 23 | 0.003 | 0.01 | 0.19 | 0.016 | 0.013 | 0.066 | 0.0018 | 0.0009 | 0.50 | 0.0020 | 0.0033 | — | — | — |
| 24 | 0.003 | 0.02 | 0.18 | 0.009 | 0.014 | 0.067 | 0.0017 | 0.0006 | 0.35 | 0.0024 | <u>0.0038</u> | — | — | — |
| 25 | 0.002 | 0.01 | 0.21 | 0.008 | <u>0.003</u> | 0.062 | 0.0022 | 0.0007 | 0.32 | 0.0023 | 0.0026 | — | — | — |
| 26 | 0.002 | 0.02 | 0.28 | 0.016 | 0.009 | 0.055 | 0.0021 | 0.0008 | 0.38 | 0.0022 | 0.0031 | — | — | — |
| 27 | 0.002 | 0.01 | 0.26 | 0.016 | 0.008 | 0.054 | 0.0019 | 0.0012 | 0.63 | 0.0021 | 0.0029 | — | — | — |
| 28 | 0.003 | 0.01 | 0.25 | 0.017 | 0.006 | 0.056 | 0.0018 | <u>0.0021</u> | <u>1.17</u> | 0.0018 | 0.0024 | — | — | — |

Note: The data underlines or those marked with * are outside the scope of the invention.
(A) : Steel No.
(B) : Constitutive Components (wt. %, except for B/N)
(H) : Others

TABLE 6

| (A) | (C) (%) | (D) (%) *1 | (E) (%) | (F) (mΩ) *2 |
|---|---|---|---|---|
| 21 | 80 | 75 | 6.1 | 90 |
| 22 | 72 | 70 | 4.5 | 60 |
| 23 | 72 | 70 | 4.1 | 30 |
| 24 | 68 | 65 | 4.2 | 50 |
| 25 | (G) | — | 4.2 | 30 |
| 26 | 74 | 70 | 3.8 | 30 |
| 27 | 76 | 75 | 3.9 | 20 |
| 28 | 80 | 60 | 5.0 | 10 |
| 29 | 72 | 70 | 4.2 | 40 |
| 30 | 72 | 70 | 4.3 | 40 |

*1 : This indicates the anti-secondary work embrittlement of the sample.
*2 : This indicates the corrosion resistance of the sample.
(A) : Steel No.
(C) : Marginal Ironing Reduction Ratio
(D) : Marginal Ironing Reduction Ratio, at which the sample produced no brittle fracture when its side cylindrical part was compressed to be flattened
(E) : Selvaging Ratio
(F) : Increase in Contact Resistance Value of Terminal Part
(G) : Failed in DI into cans.

TABLE 8

| (A) | (C) (%) | (D) (%) *1 | (E) (%) | (F) (mΩ) *2 |
|---|---|---|---|---|
| 31 | 70 | 65 | 4.1 | 20 |
| 32 | 66 | 55 | 3.9 | 50 |
| 33 | 70 | 65 | 4.2 | 40 |
| 34 | 74 | 70 | 3.8 | 20 |
| 35 | (G) | — | 3.8 | 20 |
| 36 | 70 | 65 | 4.9 | 60 |
| 37 | 74 | 70 | 3.7 | 20 |
| 38 | 80 | 75 | 3.7 | 10 |
| 39 | 78 | 75 | 3.6 | 20 |
| 40 | 76 | 70 | 5.2 | 5 |

*1: This indicates the anti-secondary work embrittlement of the sample.
*2: This indicates the corrosion resistance of the sample.
(A): Steel No.
(C): Marginal Ironing Reduction Ratio
(D): Marginal Ironing Reduction Ratio, at which the sample produced no brittle fracture when its side cylindrical part was compressed to be flattened
(E): Selvaging Ratio
(F): Increase in Contact Resistance Value of Terminal Part
(G): Failed in DI into cans.

TABLE 7

| (A) | C | Si | Mn | P | S | Sol.Al | N | (B) B | B/N | O | S/10 + O | Cr | Ni | (H) |
|---|---|---|---|---|---|---|---|---|---|---|---|---|---|---|
| 31 | 0.042 | 0.01 | 0.21 | 0.011 | 0.015 | 0.062 | 0.0021 | 0.0005 | 0.24 | 0.0017 | 0.0032 | 0.04 | — | — |
| 32 | 0.041 | 0.01 | 0.25 | 0.014 | <u>0.016</u> | 0.061 | 0.0025 | 0.0006 | 0.24 | 0.0021 | <u>0.0037</u> | 0.07 | — | — |
| 33 | 0.038 | 0.02 | 0.17 | 0.018 | 0.014 | 0.055 | 0.0029 | 0.0007 | 0.24 | 0.0020 | 0.0034 | 0.01 | — | — |
| 34 | 0.039 | 0.01 | 0.09 | 0.015 | 0.011 | 0.058 | 0.0027 | 0.0006 | 0.22 | 0.0023 | 0.0034 | 0.08 | — | — |
| 35 | 0.035 | 0.01 | 0.18 | 0.011 | 0.014 | 0.045 | 0.0022 | 0.0008 | 0.36 | <u>0.0035</u> | <u>0.0049</u> | 0.09 | — | — |
| 36 | 0.041 | 0.01 | 0.07 | 0.013 | 0.012 | 0.046 | 0.0018 | <u>0.0002</u> | <u>0.11</u> | 0.0022 | 0.0034 | <u>0.16</u> | — | — |
| 37 | 0.042 | 0.02 | 0.28 | 0.012 | 0.008 | 0.046 | 0.0019 | 0.0012 | 0.63 | 0.0022 | 0.0030 | — | 0.03 | — |
| 38 | 0.028 | 0.01 | 0.22 | 0.012 | 0.009 | 0.055 | 0.0017 | 0.0013 | 0.76 | 0.0019 | 0.0028 | — | 0.08 | — |
| 39 | 0.028 | 0.01 | 0.25 | 0.015 | 0.013 | 0.056 | 0.0025 | 0.0012 | 0.48 | 0.0018 | 0.0031 | 0.05 | 0.04 | — |
| 40 | 0.027 | 0.01 | 0.23 | 0.014 | 0.012 | 0.038 | 0.0022 | 0.0011 | 0.50 | 0.0018 | 0.0030 | 0.07 | 0.08 | — |

Note: The data underlines or those marked with * are outside the scope of the invention.
(A) : Steel No.
(B) : Constitutive Components (wt. %, except for B/N)
(H) : Others

TABLE 9

| (A) | C | Si | Mn | P | S | Sol. Al | N | O | S/10 + O | Cr | Ni | Cr + Ni |
|---|---|---|---|---|---|---|---|---|---|---|---|---|
| 41 | 0.057 | 0.02 | 0.23 | 0.015 | 0.012 | 0.038 | 0.0028 | <u>0.0027</u> | <u>0.0039</u> | —* | —* | — |
| 42 | 0.052 | 0.01 | 0.18 | 0.009 | 0.012 | 0.049 | 0.0021 | 0.0021 | 0.0033 | 0.01 | — | 0.01 |
| 43 | 0.054 | 0.01 | 0.19 | 0.012 | 0.013 | 0.054 | 0.0019 | 0.0019 | 0.0032 | 0.04 | — | 0.04 |
| 44 | 0.052 | 0.01 | 0.25 | 0.012 | 0.008 | 0.051 | 0.0022 | 0.0019 | 0.0027 | 0.08 | — | 0.08 |
| 45 | 0.051 | 0.01 | 0.22 | 0.015 | 0.009 | 0.042 | 0.0016 | <u>0.0032</u> | <u>0.0041</u> | 0.07 | — | 0.07 |
| 46 | 0.045 | 0.01 | 0.25 | 0.012 | <u>0.021</u> | 0.043 | 0.0024 | 0.0012 | 0.0033 | 0.05 | — | 0.05 |
| 47 | 0.044 | 0.02 | 0.21 | 0.014 | 0.013 | 0.044 | 0.0021 | 0.0021 | 0.0034 | 0.08 | — | 0.08 |
| 48 | 0.044 | 0.01 | 0.15 | 0.013 | 0.013 | 0.077 | 0.0029 | 0.0018 | 0.0031 | <u>0.15</u> | — | <u>0.15</u> |
| 49 | 0.042 | 0.01 | 0.19 | 0.012 | 0.009 | 0.072 | 0.0029 | 0.0019 | 0.0028 | — | 0.02 | 0.02 |
| 50 | 0.044 | 0.01 | 0.08 | 0.012 | 0.006 | 0.078 | 0.0019 | 0.0018 | 0.0024 | 0.02 | 0.04 | 0.06 |
| 51 | 0.043 | 0.02 | 0.16 | 0.012 | 0.008 | 0.069 | 0.0028 | 0.0021 | 0.0029 | — | 0.08 | 0.08 |
| 52 | 0.036 | 0.01 | 0.16 | 0.014 | 0.011 | 0.075 | 0.0028 | 0.0019 | 0.0030 | —* | —* | — |
| 53 | 0.033 | 0.02 | 0.17 | 0.011 | 0.009 | 0.042 | 0.0023 | 0.0019 | 0.0028 | 0.03 | 0.05 | 0.08 |
| 54 | 0.031 | 0.01 | 0.18 | 0.012 | 0.008 | 0.044 | 0.0021 | 0.0020 | 0.0028 | 0.08 | <u>0.12</u> | <u>0.20</u> |

Note: The data underlines or those marked with * are outside the scope of the invention.
(A): Steel No.
(I): Constitutive Components (wt. %)

TABLE 10

| (A) | (C) (%) | (F) (mΩ) *1 |
|---|---|---|
| 41 | 64 | 160 |
| 42 | 72 | 80 |
| 43 | 74 | 40 |
| 44 | 80 | 30 |
| 45 | (G) | 30 |
| 46 | 62 | 40 |
| 47 | 72 | 30 |
| 48 | 72 | 60 |
| 49 | 78 | 50 |
| 50 | 82 | 20 |
| 51 | 76 | 40 |
| 52 | 72 | 130 |
| 53 | 76 | 30 |
| 54 | 64 | 20 |

*1: This indicates the corrosion resistance of the sample.
(A): Steel No.
(C): Marginal Ironing Reduction Ratio
(F): Increase in Contact Resistance Value of Terminal Part
(G): Failed in DI into cans.

TABLE 12

| (A) | (C) (%) | (F) (mΩ) *1 |
|---|---|---|
| 55 | 76 | 70 |
| 56 | 76 | 40 |
| 57 | 62 | 30 |
| 58 | 70 | 30 |
| 59 | 76 | 50 |
| 60 | 74 | 40 |
| 61 | 76 | 20 |
| 62 | 76 | 20 |
| 63 | 66 | 20 |

*1: This indicates the corrosion resistance of the sample.
(A): Steel No.
(C): Marginal Ironing Reduction Ratio
(F): Increase in Contact Resistance Value of Terminal Part

TABLE 11

| (A) | C | Si | Mn | P | S | Sol. Al | N | O | S/10 + O | Cr | Ni | Cr + Ni |
|---|---|---|---|---|---|---|---|---|---|---|---|---|
| 55 | 0.004 | 0.01 | 0.22 | 0.017 | 0.012 | 0.041 | 0.0019 | 0.0017 | 0.0029 | <u>0.01</u> | — | 0.01 |
| 56 | 0.003 | 0.01 | 0.21 | 0.016 | 0.012 | 0.045 | 0.0018 | 0.0018 | 0.0030 | 0.04 | — | 0.04 |
| 57 | 0.003 | 0.01 | 0.21 | 0.009 | <u>0.024</u> | 0.044 | 0.0017 | 0.0019 | <u>0.0043</u> | 0.06 | — | 0.06 |
| 58 | 0.002 | 0.01 | 0.22 | 0.008 | 0.005 | 0.048 | 0.0021 | 0.0021 | 0.0026 | 0.08 | — | 0.08 |
| 59 | 0.002 | 0.02 | 0.25 | 0.016 | 0.009 | 0.051 | 0.0022 | 0.0019 | 0.0028 | <u>0.14</u> | — | <u>0.14</u> |
| 60 | 0.002 | 0.01 | 0.27 | 0.018 | 0.009 | 0.054 | 0.0018 | 0.0022 | 0.0031 | — | 0.03 | 0.03 |
| 61 | 0.003 | 0.02 | 0.24 | 0.011 | 0.012 | 0.056 | 0.0018 | 0.0019 | 0.0031 | — | 0.09 | 0.09 |
| 62 | 0.003 | 0.01 | 0.26 | 0.015 | 0.012 | 0.055 | 0.0020 | 0.0018 | 0.0030 | 0.04 | 0.04 | 0.08 |
| 63 | 0.002 | 0.02 | 0.27 | 0.017 | 0.013 | 0.058 | 0.0015 | 0.0017 | 0.0030 | 0.08 | 0.08 | <u>0.16</u> |

Note: The data underlines or those marked with * are outside the scope of the invention.
(A): Steel No.
(I): Constitutive Components (wt. %)

What is claimed is:

1. A cold-rolled steel sheet for 2-piece battery cans with excellent formability, consisting essentially of from 0 to 0.06 wt. % of C, from 0 to 0.03 wt. % of Si, from 0.1 to 0.3 wt. % of Mn, from 0 to 0.02 wt. % of P, from 0.01 to 0.10 wt. % of sol.Al, from 0 to 0.004 wt. % of N, S and O (provided that O is the total oxygen content) while satisfying the conditions that S is from 0.005 to 0.015 wt. %, that O is from 0 to 0.0025 wt. % and that {S/10+O}≦0.0035 wt. % and the balance consisting of Fe and unavoidable impurities.

2. A cold-rolled steel sheet for 2-piece battery cans with excellent formability, anti-secondary work embrittlement and corrosion resistance, consisting essentially of from 0 to 0.06 wt. % of C, from 0 to 0.03 wt. % of Si, from 0.1 to 0.3 wt. % of Mn, from 0 to 0.02 wt. % of P, from 0.01 to 0.10 wt. % of sol.Al, from 0 to 0.004 wt. % of N, B of from 0.0005 to 0.0015 wt. % while satisfying the condition that 0.2≦B/N≦1.0, S and O (provided that O is the total oxygen content) while satisfying the conditions that S is from 0.005 to 0.015 wt. %, that O is from 0 to 0.0025 wt. % and that {S/10+O}≦0.0035 wt. % and the balance consisting of Fe and unavoidable impurities.

3. A cold-rolled steel sheet for 2-piece battery cans with excellent formability, anti-secondary work embrittlement and corrosion resistance, consisting essentially of from 0 to 0.06 wt. % of C, from 0 to 0.03 wt. % of Si, from 0.1 to 0.3 wt. % of Mn, from 0 to 0.02 wt. % of P, from 0.01 to 0.10 wt. % of sol.Al, from 0 to 0.004 wt. % of N, B of from 0.0005 to 0.0015 wt. % while satisfying the condition that 0.2≦B/N≦1.0, either one or both of Cr being from 0.03 to 0.10 wt. % and Ni being from 0.01 to 0.10 wt. %, the total of the two being 0.10 wt. % or less, S and O (provided that O is the total oxygen content) while satisfying the conditions that S is from 0.005 to 0.015 wt. %, that O is from 0 to 0.0025 wt. % and that {S/10+O}≦0.0035 wt. % and the balance consisting of Fe and unavoidable impurities.

4. A cold-rolled steel sheet for 2-piece battery cans with excellent formability and corrosion resistance, consisting essentially of from 0 to 0.06 wt. % of C, from 0 to 0.03 wt. % of Si, from 0.1 to 0.3 wt. % of Mn, from 0 to 0.02 wt. % of P, from 0.01 to 0.10 wt. % of sol.Al, from 0 to 0.004 wt. % of N, either one or both of Cr being from 0.03 to 0.10 wt. % and Ni being from 0.01 to 0.10 wt. %, the total of the two being 0.10 wt. % or less, S and O (provided that O is the total oxygen content) while satisfying the conditions that S is from 0.005 to 0.015 wt. %, that O is from 0 to 0.0025 wt. % and that {S/ 10+O}≦0.0035 wt. % and the balance consisting of Fe and unavoidable impurities.

5. A cold-rolled steel sheet for 2-piece battery cans with excellent formability and corrosion resistance, consisting essentially of from 0 to 0.06 wt. % of C, from 0 to 0.03 wt. % of Si, from 0.1 to 0.3 wt. % of Mn, from 0 to 0.02 wt. % of P, from 0.01 to 0.10 wt. % of sol.Al, from 0 to 0.004 wt. % of N, either one or both of Cr being from 0.05 to 0.10 wt. % and Ni being from 0.03 to 0.10 wt. %, the total of the two being 0.10 wt. % or less, S and O (provided that O is the total oxygen content) while satisfying the conditions that S is from 0.005 to 0.015 wt. %, that O is from 0 to 0.0025 wt. % and that {S/10+O}≦0.0035 wt. % and the balance consisting of Fe and unavoidable impurities.

6. A cold-rolled steel sheet for 2-piece battery cans with excellent formability, consisting essentially of C of from 0 to 0.06 wt. %, S and O (provided that O is the total oxygen content) while satisfying the conditions that S is from 0.005 to 0.015 wt. %, that O is from 0 to 0.0025 wt. % and that {S/10+O}≦0.0035 wt. %, and the balance consisting of Fe and unavoidable impurities.

7. A cold-rolled steel sheet for 2-piece battery cans with excellent formability, consisting essentially of C of from 0 to 0.06 wt. %, S and O (provided that O is the total oxygen content) while satisfying the conditions that S is from 0.005 to 0.012 wt. %, that O is from 0 to 0.0025 wt. % and that {S/10+O}≦0.0030 wt. %, and the balance consisting of Fe and unavoidable impurities.

8. A cold-rolled steel sheet for 2-piece battery cans with excellent formability, anti-secondary work embrittlement and corrosion resistance, consisting essentially of C of from 0 to 0.06 wt. %, B of from 0.0005 to 0.0015 wt. % while satisfying the condition that 0.2≦B/N≦1.0, S and O (provided that O is the total oxygen content) while satisfying the conditions that S is from 0.005 to 0.015 wt. %, that O is from 0 to 0.0025 wt. % and that {S/10+O}≦0.0035 wt. %, and the balance consisting of Fe and unavoidable impurities.

9. A cold-rolled steel sheet for 2-piece battery cans with excellent formability, antisecondary work embrittlement and corrosion resistance, consisting essentially of C of from 0 to 0.06 wt. %, B of from 0.0005 to 0.0015 wt. % while satisfying the condition that 0.2≦B/N≦1. 0, either one or both of Cr of from 0.03 to 0.10 wt. % and Ni of from 0.01 to 0.10 wt. %, the total of the two being 0.10 wt. % or less, S and O (provided that O is the total oxygen content) while satisfying the conditions that S is from 0.005 to 0.015 wt. %, that O is from 0 to 0.0025 wt. % and that {S/10+O}≦0.0035 wt. %, and the balance consisting of Fe and unavoidable impurities.

10. A cold-rolled steel sheet for 2-piece battery cans with excellent formability and corrosion resistance, consisting essentially of C of from 0 to 0.06 wt. %, either one or both of Cr of from 0.03 to 0.10 wt. % and Ni of from 0.01 to 0.10 wt. %, the total of the two being 0.10 wt. % or less, S and O (provided that O is the total oxygen content) while satisfying the conditions that S is from 0.005 to 0.015 wt. %, that O is from 0 to 0.0025 wt. % and that {S/10+O}≦0.0035 wt. %, and the balance consisting of Fe and unavoidable impurities.

11. A cold-rolled steel sheet for 2-piece battery cans with excellent formability and corrosion resistance, consisting essentially of C of from 0 to 0.06 wt. %, either one or both of Cr of from 0.05 to 0.10 wt. % and Ni of from 0.03 to 0.10 wt. %, the total of the two being 0.10 wt. % or less, S and O (provided that O is the total oxygen content) while satisfying the conditions that S is from 0.005 to 0.015 wt. %, that O is from 0 to 0.0025 wt. % and that {S/10+O}≦0.0035 wt. %, and the balance consisting of Fe and unavoidable impurities.

12. The cold-rolled steel sheet for 2-piece battery cans with excellent formability as claimed in claim 1, which contains S and O (provided that O is the total oxygen content) while satisfying the conditions that S is from 0.005 to 0.012 wt. %, that O is from 0 to 0.0025 wt. % and that [S/10+O]≦0.0030 wt. %.

13. The cold-rolled steel sheet for 2-piece battery cans with excellent formability, anti-secondary work embrittlement and corrosion resistance as claimed in claim 8, which contains S and O (provided that O is the total oxygen content) while satisfying the conditions that S is from 0.005 to 0.012 wt. %, that O is from 0 to 0.0025 wt. % and that [S/10+O]≦0.0030 wt. %.

14. The cold-rolled steel sheet for 2-piece battery cans with excellent formability, anti-secondary work embrittlement and corrosion resistance as claimed in claim 2, which contains S and O (provided that O is the total oxygen content) while satisfying the conditions that S is from 0.005 to 0.012 wt. %, that O is from 0 to 0.0025 wt. % and that [S/10+O]≦0.0030 wt. %.

15. The steel sheet for 2-piece battery cans with excellent formability, anti-secondary work embrittlement and corrosion resistance as claimed in claim 9, which contains S and O (provided that O is the total oxygen content) while satisfying the conditions that S is from 0.005 to 0.012 wt. %, that O is from 0 to 0.0025 wt. % and that $[S/10+O] \leqq 0.0030$ wt. %.

16. The cold-rolled steel sheet for 2-piece battery cans with excellent formability, anti-secondary work embrittlement and corrosion resistance as claimed in claim 3, which contains S and O (provided that O is the total oxygen content) while satisfying the conditions that S is from 0.005 to 0.012 wt. %, that O is from 0 to 0.0025 wt. % and that $[S/10+O] \leqq 0.0030$ wt. %.

17. The cold-rolled steel sheet for 2-piece battery cans with excellent formability and corrosion resistance as claimed in claim 10, which contains S and O (provided that O is the total oxygen content) while satisfying the conditions that S is from 0.005 to 0.012 wt. %, that O is from 0 to 0.0025 wt. % and that $[S/10+O] \leqq 0.0030$ wt. %.

18. The steel sheet for 2-piece battery cans with excellent formability and corrosion resistance as claimed in claim 4, which contains S and O (provided that O is the total oxygen content) while satisfying the conditions that S is from 0.005 to 0.012 wt. %, that O is from 0 to 0.0025 wt. % and that $[S/10+O] \leqq 5\ 0.0030$ wt. %.

19. The cold-rolled steel sheet for 2-piece battery cans with excellent formability and corrosion resistance as claimed in claim 11, which contains S and O (provided that O is the total oxygen content) while satisfying the conditions that S is from 0.005 to 0.012 wt. %, that O is from 0 to 0.0025 wt. % and that $[S/10+O] \leqq 0.0030$ wt. %.

20. The steel sheet for 2-piece battery cans with excellent formability and corrosion resistance as claimed in claim 5, which contains S and O (provided that O is the total oxygen content) while satisfying the conditions that S is from 0.005 to 0.012 wt. %, that O is from 0 to 0.0025 wt. % and that $[S/10+O] \leqq 0.0030$ wt. %.

21. The cold-rolled steel sheet for 2-piece battery cans as claimed in any one of claims 1 to 20, wherein said steel sheet has two surfaces, and wherein both surfaces have at least a Ni plate layer or an Fe—Ni alloy plate layer thereon.

22. The cold-rolled steel sheet for 2-piece battery cans as claimed in any one of claims 1 to 20 which comprises a cold-rolled steel sheet produced through at least the steps of hot rolling, cold rolling, and annealing.

23. The cold-rolled steel sheet for 2-piece battery cans as claimed in claim 22, wherein said steel sheet as two surfaces, and wherein both surfaces have at least a Ni plate layer or an Fe—Ni alloy plate layer thereon.

* * * * *